W. SIMON.

Traveling Bag.

No. 9,772. Reissued June 21, 1881.

Witnesses.

W. H. Mortimer

W. H. Kern.

Inventor.

Wm. Simon, per

F. A. Lehmann,

Att'y

N. PETERS, Photo-Lithographer, Washington, D. C.

UNITED STATES PATENT OFFICE.

WILLIAM SIMON, OF NEW YORK, N. Y.

TRAVELING-BAG.

SPECIFICATION forming part of Reissued Letters Patent No. 9,772, dated June 21, 1881.

Original No. 177,020, dated May 2, 1876. Application for reissue filed March 15, 1881.

*To all whom it may concern:*

Be it known that I, WM. SIMON, of New York, in the county of New York and State of New York, have invented certain new and useful Improvements in Traveling-Bags; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

My invention relates to an improvement in traveling-bags and satchels; and it consists, first, in placing the lock, fastening, and ring-loops all upon a single plate, and thereby dispensing with so many different fastenings; second, in the manner of striking up the lock-plate so as to form recesses to receive the ring-loops, whereby they are held more firmly and securely in position; third, in attaching the rings or other suitable devices of the carrying-strap to the lock, all of which will be more fully described hereinafter.

Figure 1:
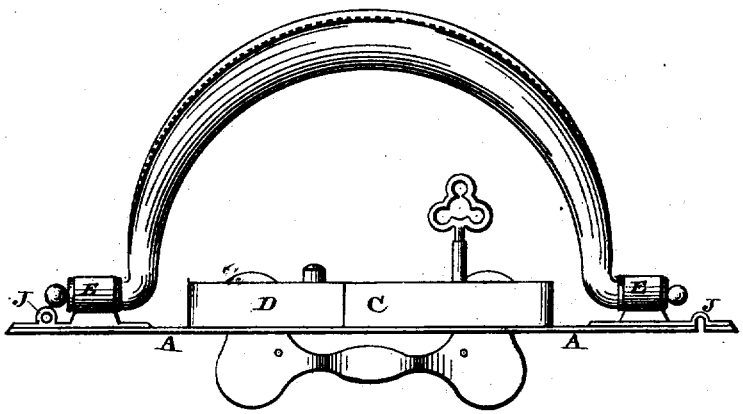
Figure 2:
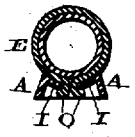

Figure 1 is a side elevation of my invention. Fig. 2 is a detailed vertical section of the same.

A represents the lock-plate, which, instead of being made just long enough to receive the lock C alone, as is usual, is here made long enough to receive the lock, fastening D, and ring-loops E all together. By this means all these parts can be attached to the frame of the bag or satchel at once, thereby dispensing with a large number of rivets or other fastenings and saving much time and labor.

The lock, fastening, and ring-loops may be of any construction desired, as they form no part of this invention.

Just beyond the ends of both the lock and the fastening the lock-plate A is struck up from below, so as to form a concavity or recess, I, on top of the plate to receive the ring-loops. These rings, being thus braced in position against side motion and prevented from moving by the clinches O, which pass down through slots in the plate A, are held more firmly and securely in position than they can be in any other manner.

It will be readily seen by the above-described construction that but two rivets at each end of the lock-plate will serve to securely fasten all four parts to the bag-frame, thereby serving to dispense with so much skilled labor and to prevent the weakening of the frame.

Cross-creases J are also struck up in the plate A to receive rings or other suitable devices for fastening the carrying-strap to, whereby all special fastenings for these rings or devices are done away with.

It will be seen that when the lock is fastened to the bag the handle and the rings for the carrying-straps are fastened on at the same time, thereby saving time, trouble, and expense, and enabling skilled labor to be dispensed with to a great degree.

Having thus described my invention, I claim—

1. In traveling-bags or satchels, a lock-plate having secured to it the lock, fastening, and ring-loops, substantially as shown.

2. The lock-plate A, having the recesses I formed in or on its surface to receive the ring-loop, substantially as described.

3. In combination with the plate A, a lock and a fastening device, all secured together in the manner described, and adapted to be fastened to the bag-frame, substantially as set forth.

4. A lock for traveling-bags, provided with means, substantially as shown and described, whereby the rings of the carrying-strap can be attached directly thereto, substantially as specified.

5. A lock for traveling-bags and satchels, having its bottom plate provided with the creases J for the reception of the rings for the handles, substantially as set forth.

In testimony whereof I affix my signature in presence of two witnesses.

WM. SIMON.

Witnesses:
LEVY MAYBAUM,
SAMUEL JACOBSON.